B. F. GREENE.
DROP MOLDING ATTACHMENT FOR MACHINES.
APPLICATION FILED JUNE 7, 1918.
1,299,327.
Patented Apr. 1, 1919.
3 SHEETS—SHEET 1.
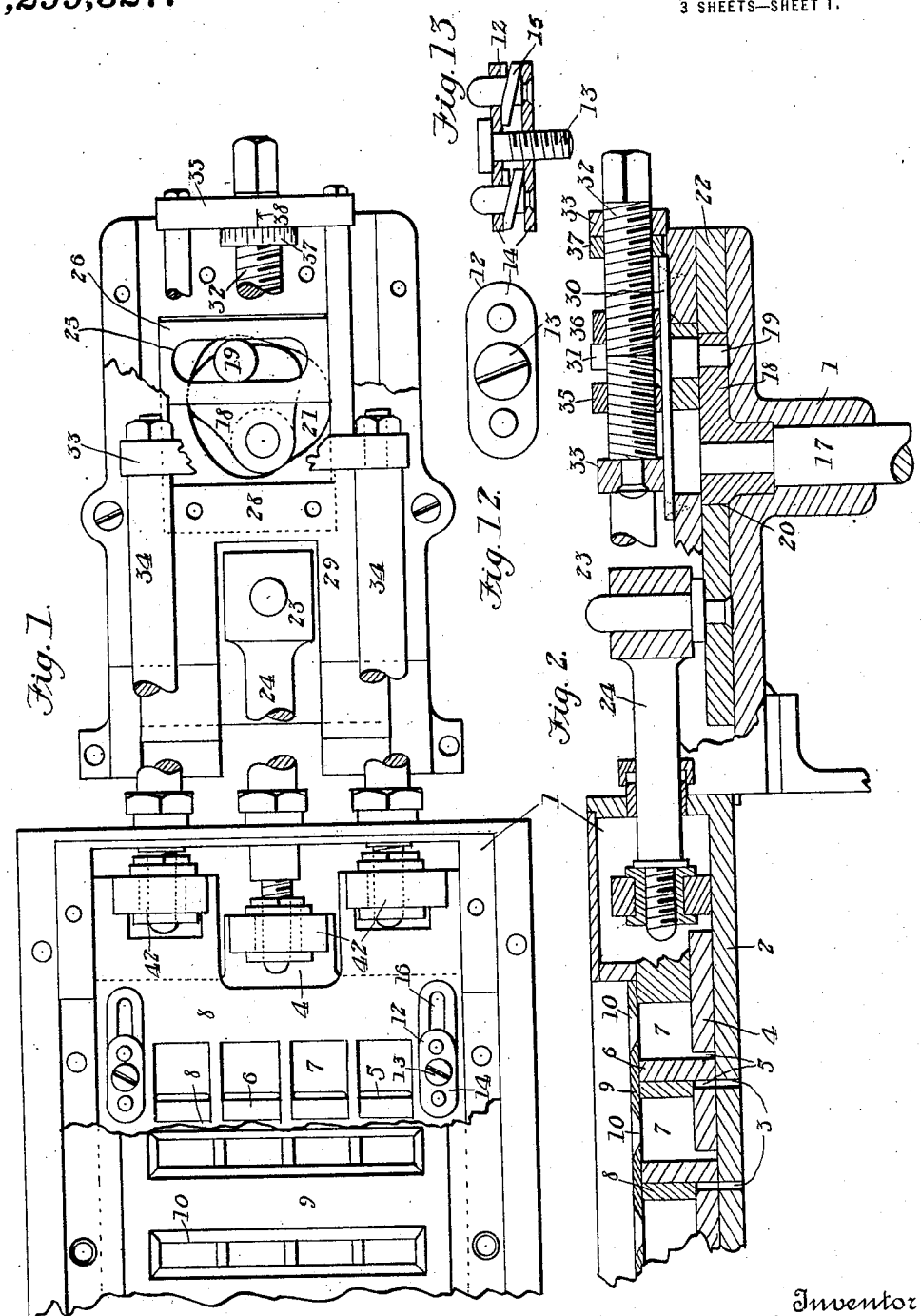
Inventor
B. F. Greene.
By Victor J. Evans
Attorney B. F. GREENE.
DROP MOLDING ATTACHMENT FOR MACHINES.
APPLICATION FILED JUNE 7, 1918.
1,299,327.
Patented Apr. 1, 1919.
3 SHEETS—SHEET 2.
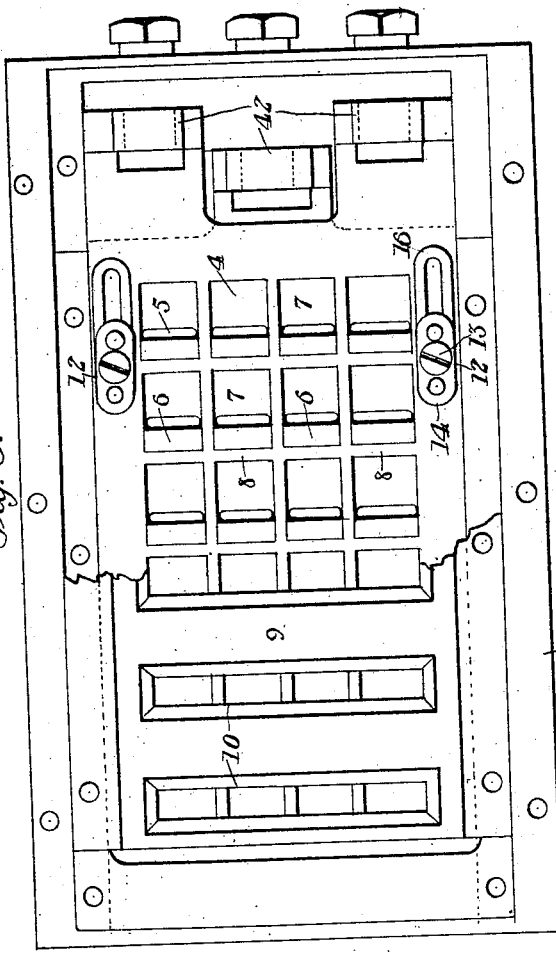
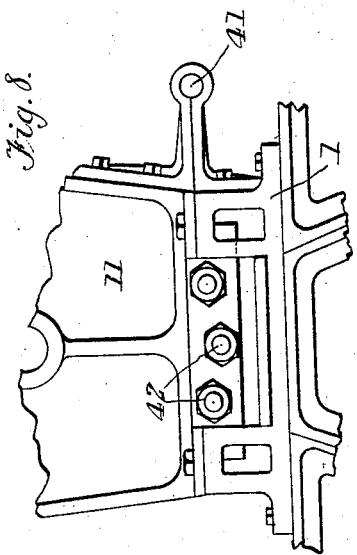
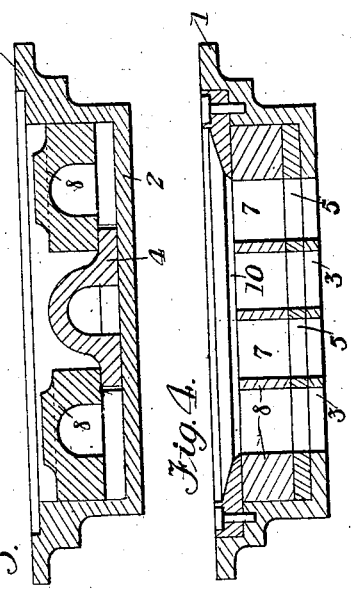
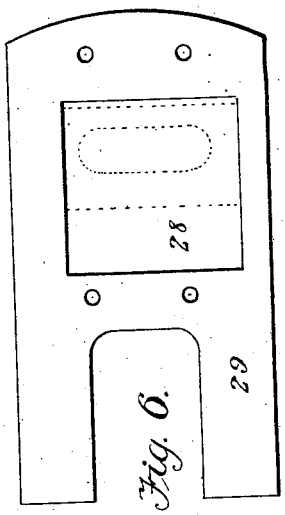
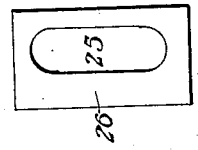
Inventor
B.F. Greene.
By Victor J. Evans
Attorney B. F. GREENE.
DROP MOLDING ATTACHMENT FOR MACHINES.
APPLICATION FILED JUNE 7, 1918.
1,299,327.
Patented Apr. 1, 1919.
3 SHEETS—SHEET 3.
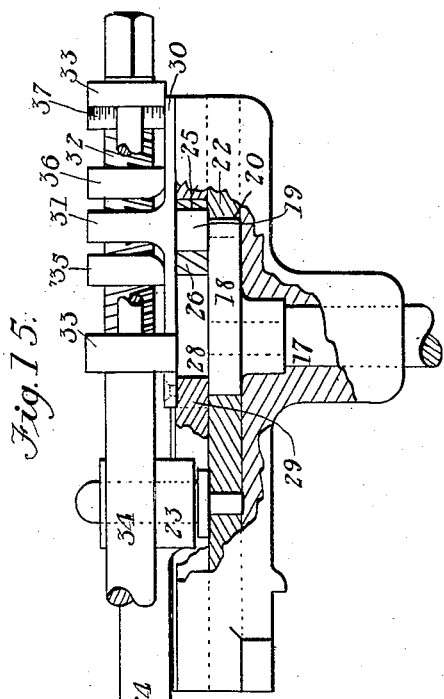
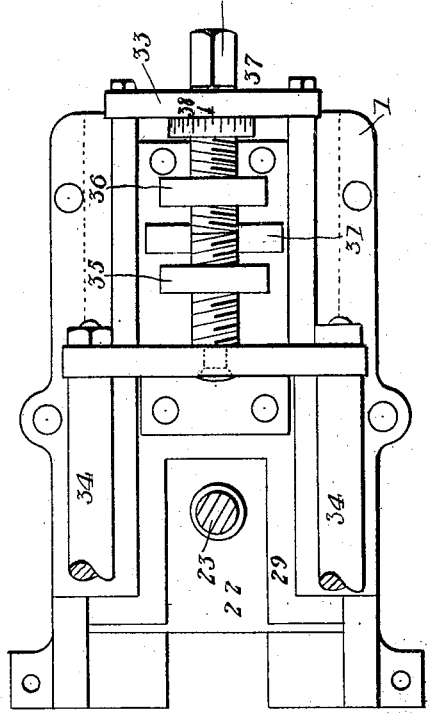
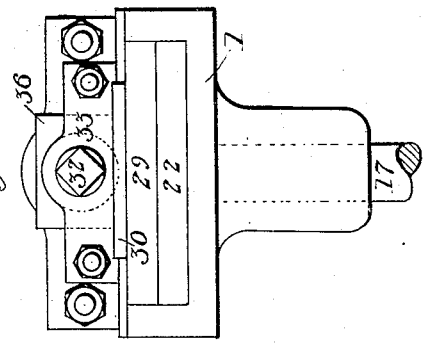
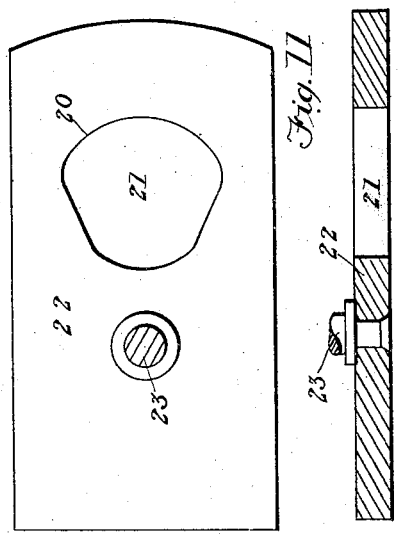
Inventor
B.F. Greene.
By Victor J. Evans
Attorney

UNITED STATES PATENT OFFICE.

BENJAMIN F. GREENE, OF PITTSBURGH, PENNSYLVANIA.

DROP-MOLDING ATTACHMENT FOR MACHINES.

1,299,327. Specification of Letters Patent. Patented Apr. 1, 1919.

Application filed June 7, 1918. Serial No. 238,720.

*To all whom it may concern:*

Be it known that I, BENJAMIN F. GREENE, a citizen of the United States, residing at Pittsburgh, in the county of Allegheny and State of Pennsylvania, have invented new and useful Improvements in Drop-Molding Attachments for Machines, of which the following is a specification.

This invention relates to a drop molding attachment for machines and has for its primary object to provide an attachment that accurately forms and drops material of a uniform weight automatically.

My invention in its particular showing relates to new and useful improvements in drop molding and filling mechanism of candy machines whereby candy may be formed into a variety of shapes and weights and in such a manner that a uniform weight of any variety is assured.

Another object of the invention is to provide mechanism for accomplishing the foregoing results which may be adjusted in a very simple manner for changing the size of the articles dropped without the necessity of changing the molding elements.

With these and other objects in view the invention will be better understood from the following detailed description taken in connection with the accompanying drawings wherein:

Figure 1 is a top plan view of the mechanism.

Fig. 2 is a longitudinal sectional view.

Fig. 3 is a top plan view of the molding device.

Fig. 4 is a cross sectional view of Fig. 3 on the line 4—4.

Fig. 5 is a sectional view on line 5—5 of Fig. 3.

Fig. 6 is a plan view of the slide plate.

Fig. 7 is a plan view of the block associating with the slide plate.

Fig. 8 is an end elevation of the hopper and associated parts.

Fig. 9 is a view illustrating the regulator.

Figs. 10 and 11 are views of the slide.

Figs. 12 and 13 are views of the yieldable device.

Fig. 14 is a sectional view on line 14—14 Fig. 9.

Fig. 15 is an elevation partly in section of the operating mechanism for the plates.

Referring to the drawings illustrating one manner in which my invention may be constructed, the numeral 1 designates a casing in which a portion of the mechanism to be described is mounted for sliding movement. The bottom 2 of the casing has arranged therein discharge openings 3 which may be of any size and configuration depending entirely upon the result to be obtained. Slidably mounted upon the bottom 2 is a plate 4 hereinafter known as the bottom plate to be distinguished from a coöperating plate hereinafter described. This plate 4 is provided with twice the number of openings 5 to the openings 3 and adapted to register therewith upon the plate 4 reaching predetermined positions. By this arrangement it will be seen that when the plate 4 is moved a predetermined distance in one direction one-half of the openings 5 are registered with the openings 3 whereas upon movement of the plate 4 a predetermined distance in the opposite direction the remaining openings 5 will be moved to register with the openings 3. Connected with the plate 4 is a plurality of ribs 6 shown in this particular instance of a rectangular formation snugly mounted for sliding movement within the rectangular shaped pockets 7 in a top plate 8. Thus it will be seen that independent movement of the plate 8 upon the plate 4 will change the position of the ribs 6 in the pockets 7 for the purpose hereinafter described.

It will be noted by referring to the drawings that each rib 6 is associated with a pair of openings 5 disposed to opposite sides of the rib with a result that substance deposited in the pockets 7 will be forcibly moved through those openings 5 that are in registration with the openings 3 due to the coöperation of the plate 8 with the ribs 6. To complete the feed apparatus I provide a feed plate 9 having a plurality of ports 10 registering with the pockets 7. This plate 9 forms the bottom for a hopper 11 in which the material or candy substance to be molded is arranged. The plates 4 and 8 are connected to each other by a yieldable device 12 shown in this particular instance as consisting of a screw 13 threaded in the bottom plate and mounted for movement in slots 16 in the top plate. Each screw has arranged thereon a pair of plates 14 forced away from each other by suitably arranged springs 15. The plates 14 are mounted for slidable movement within slots 16 in the top plate.

Any suitable mechanism may be provided for giving the necessary reciprocatory movements to the plates 4 and 8 but for the purpose of illustration I have shown one form in the drawing but I do not wish to be limited to the exact construction shown. Mounted for rotation and driven in any suitable manner is a shaft 17 shown in the drawing as assuming a vertical position with the upper end thereof secured to a cam 18. Secured to the cam 18 is a pin 19. Coöperating with the cam 18 is the wall 20 of an opening 21 formed in a slide 22 and of a shape to coöperate with the cam in a manner to move the plate a predetermined distance in two directions. This slide 22 has a detachable connection 23 with a rod 24 that is in turn connected to the bottom plate 4.

Coöperating with the pin 19 is the slot 25 arranged in a block 26 that is in turn slidably mounted in an opening 28 of a predetermined area in the plate 29, the latter being mounted for slidable movement upon the casing or frame 1. Secured to the plate 29 in any suitable manner is a bracket 30, including a pair of arms 31 straddling a right and left screw 32. This screw 32 is mounted for rotation in the frame 33 that is in turn connected to a pair of rods 34 slidably mounted in the casing 1 and secured to the top slide 8. Engaging the right and left hand threads of the screw 32 are nuts 35 and 36 arranged to be engaged by the arms when the block 26 reaches predetermined positions, thus providing a lost motion connection between the plate 29 and frame 33, the degree of lost motion being regulated by adjusting the nuts 35 and 36 relative to the arms 31. For the purpose of accurately adjusting the nuts 35 and 36 with relation to the arms 32 the screw has mounted thereon a dial 37 arranged to coöperate with mark 38 on the frame 33. Of course it is to be understood that the nuts 35 and 36 are held against independent rotatable movement upon the screw by the engagement of certain flat faces of the nuts with frame 33.

When the mechanism is in one of its extreme positions as shown in Figs. 1 and 2 it will be noted that the pockets do not communicate with the discharge openings 3 as the top plate 8 covers those openings 5 that are in registration with the discharge openings 3; whereas the remaining openings 5 are closed by the bottom 2. Upon rotation of the shaft 17 the cam 18 will start moving the bottom plate 4 and simultaneously with this action the pin 19 is moving the top plate 8 through its coöperation with the wall of the opening 21. After the top and bottom plates have traveled a predetermined distance together, the bottom plate stops after the cam 18 has reached a position, in the opening 21 where it will not move the slide 22 while the top plate continues its movement owing to the relation of the pin 19 to the slot 23, thereby forcing the material from the pockets through the openings 3 and 5 that are now in registration. The yieldable device 12 allows this relative movement of the plates but at the same time keeping both plates in smooth sliding relation. The throw of the top plate 8 for regulating the amount of material passing through the openings can be accurately regulated by adjusting the screw 32, thereby varying the distances between the nuts 35 and 36 and arm 31 which varies the time of engagement between the arms 31 and nuts. A very important feature of my invention that I wish to call attention to at this time is the construction and coöperation of the top and bottom plates whereby independent molds are provided for independently molding the candy material and in such a manner that each finished article will be of the same weight. In concluding my description I wish to call attention to the fact that plates 4 and 8 initially move forward together until one-half of the openings 5 register with the discharge openings 3 after which time the plate 4 comes to rest and plate 8 continues its movement until the material in the pocket 7 has been forced through the openings 5 that are now in registration with openings 3. The return movement of the plates is identical with that described with relation to the forward movement. If found advantageous in practice the hopper 11 may be hinged to the casing 1 as indicated at 41 and the rods 24 and 34 adjustably connected to the plates as indicated at 42.

It is to be understood that while all of the several features of my improved mechanism have special coöperation with one another and together constitute a particularly effective mechanism for the purpose in view, certain of these features may be applied in other relations, and I therefore desire to cover the combinations present in the several parts of my improved mechanism whether employed in the general organization shown or elsewhere.

It is to be further understood that the structural embodiment of the invention as a whole and its various features as shown is merely illustrative and not restrictive, since I am well aware that many of the details of construction can be widely varied without departing from the spirit of the invention. I therefore do not desire to be limited in these particulars or in any other, except as set forth in the appended claims.

Having described my invention, what I claim is:

1. A drop molding attachment for candy machines comprising, a casing having discharge openings, a plate slidably mounted in the casing and having discharge openings adapted to register with the discharge openings in the casing in a predetermined position of the plate, and a second plate movable over the first plate and having candy receiving pockets communicating with the discharge openings in said first plate.

2. A drop molding attachment for candy machines comprising, a casing having discharge openings, a plate slidably mounted in the casing and having discharge openings adapted to register with the discharge openings in the casing in a predetermined position of the plate, a second plate movable over the first plate and having candy receiving pockets communicating with the discharge openings in said first plate, and mechanical means for moving the plates together and relative to each other.

3. A drop molding attachment for candy machines comprising, a casing having discharge openings, a plate slidably mounted in the casing and having discharge openings adapted to register with the discharge openings in the casing in a predetermined position of the plate, a second plate movable over the first plate and having candy receiving pockets communicating with the discharge openings in said first plate and mechanical means for moving the plates together or independently, said means comprising a rotatable cam having connection with both plates.

4. A drop molding attachment for candy machines comprising a casing having discharge openings, a plate slidably mounted in the casing and having discharge openings adapted to register with the discharge openings in the casing in predetermined positions of the plate, a second plate movable over the first plate and having candy receiving pockets communicating with the discharge openings in said first plate, mechanical means for moving the plates together or independently, said means comprising a rotatable cam having connection with both plates, and means for regulating the travel of one of said plates.

5. A drop molding attachment for candy machines comprising, a casing having discharge openings, a plate slidably mounted on the casing, and having discharge openings adapted to register with said first mentioned openings, a second plate slidable on the first plate and having pockets arranged in communication with discharge openings in said first plate, means for initially moving both plates together and subsequently moving said second plate independently, and means for regulating the travel of said second plate.

6. A drop molding attachment for candy machines comprising a casing having discharge openings, a plate slidably mounted on the casing, and having discharge openings adapted to register with said first mentioned openings, a second plate slidable on the first plate and having pockets arranged in communication with the discharge openings in said first plate, means for initially moving both plates together and subsequently moving said second plate, said plates having a yieldable connection with each other for the purpose set forth.

7. A drop molding attachment for candy machines comprising a casing having discharge ports, a plate slidably mounted thereon and having discharge ports adapted to register with said first mentioned ports, a second plate slidable on the first plate and provided with pockets communicating with the ports in said first plate, means for supplying candy material to said pockets, and drive mechanism including a cam having a connection with one of said plates and a pin and slot connection with the other of said plates.

8. A drop molding attachment for candy machines comprising a casing having discharge ports, a plate slidably mounted thereon and having discharge ports adapted to register with said first mentioned ports, a second plate slidable on the first plate and provided with pockets communicating with the ports in said first plate, means for supplying candy material to said pockets, drive mechanism including a cam having a connection with one of said plates, a pin and slot connection between said cam and the other of said plates, and means for regulating the travel of one of said plates.

9. A drop molding attachment for candy machines comprising a casing having discharge ports, a plate slidably mounted thereon and having discharge ports adapted to register with said first mentioned ports, a second plate slidable on the first plate and provided with pockets communicating with the ports in said first plate, means for supplying candy material to said pockets, drive mechanism including a cam having a connection with one of said plates, a pin and slot connection between said cam and the other of said plates, and means for regulating the travel of one of said plates independent of the movement of said cam.

10. A candy machine comprising a hopper having discharge ports, a casing arranged under the hopper and provided with discharge ports, a plate slidable within the casing and having discharge ports adapted to register with the ports in the casing, a second plate slidably mounted upon the first plate directly under the ports in said hopper and provided with pockets in registration with ports in the hopper in predetermined position of the plates and continuous in registration with the ports in said first plate, drive mechanism including a cam connected to said first plate for giving sliding movements thereto, a slide having a pin and slot connection with the cam and a regulating device connecting the slide to said second plate.

In testimony whereof I affix my signature.

BENJAMIN F. GREENE.